United States Patent [19]

Fukui

[11] Patent Number: 4,626,722

[45] Date of Patent: Dec. 2, 1986

[54] GEARED MOTOR

[75] Inventor: Kiyozumi Fukui, Gifu, Japan

[73] Assignee: Teijin Seiki Company Limited, Osaka, Japan

[21] Appl. No.: 649,719

[22] Filed: Sep. 12, 1984

[30] Foreign Application Priority Data

Sep. 16, 1983 [JP] Japan .................. 58-171877

[51] Int. Cl.$^4$ .................. H02K 7/06
[52] U.S. Cl. .................. 310/82; 310/83
[58] Field of Search .................. 310/80–83

[56] References Cited

U.S. PATENT DOCUMENTS

| | | | |
|---|---|---|---|
| 2,703,370 | 3/1955 | Steensen | 310/82 |
| 3,334,253 | 8/1967 | Hill | 310/82 |
| 3,558,944 | 1/1971 | Verge | 310/82 |
| 3,577,049 | 5/1971 | Madurski | 310/824 |
| 3,770,997 | 11/1973 | Presley | 310/82 |
| 4,367,424 | 1/1983 | Presley | 310/82 |

FOREIGN PATENT DOCUMENTS 57-208838 12/1982 Japan .

OTHER PUBLICATIONS

Hiroshi Yamada "Basic and Application for a Precision Small Motor", Jul. 10, 1983, Sougo Denshi Publication Company.

Primary Examiner—Donovan F. Duggan

[57] ABSTRACT

A geared motor comprising: an output shaft rotatably received in a housing; a sun gear securely supported on the output shaft in the housing and having a plurality of external teeth; a ring gear housed in the housing and having a plurality of internal teeth meshed with the external teeth of the sun gear, and the internal teeth of the ring gear having a pitch circle larger than that of the external teeth of the sun gear and being larger in number than the external teeth of the sun gear; supporting means for supporting the ring gear in such manner that the center axis of the ring gear is eccentrically revolvable with respect to the axis of rotation of the output shaft and the ring gear is prevented from being rotated about its center axis; and drive means for generating electromagnetic forces one group of which has a plurality of force directions radially inwardly directed and the other group of which has a plurality of force directions radially outwardly directed, the different groups being circumferentially successively displaceable and driving the ring gear to radially inwardly and outwardly move so that the output shaft is driven to rotate about its axis of rotation.

2 Claims, 8 Drawing Figures

GEARED MOTOR

FIELD OF THE INVENTION

The present invention relates to a geared motor, and in particular to a geared motor which is used as a motor having a characteristic of low speeds and high torques.

BACKGROUND OF THE INVENTION

In general, such low speed and high torque geared motors are employed in a wide variety of industrial robots. A representative known geared motor is described in Japanese Laying-open Publication No. 57-208838. The known geared motor comprises first and second arms connected to each other and pivotable with respect to each other about an axis of rotation, and a housing accommodating a geared motor therein. The geared motor comprises a pair of first spaced and parallel ring gears secured to the housing, a pair of spaced and parallel planetary gears held in meshing engagement to the first ring gears, respectively, a pair of second spaced and parallel ring gears positioned axially outwardly of the first ring gears and having axes of rotation substantially in axial alignment with the axes of the first ring gears, the second ring gears having rotary shafts, respectively, which are rotatably supported on the housing but securely mounted on the second arms, respectively, and which have axes of rotation in coaxial relationship to the axes of rotation of the first and second arms, respectively. The second ring gears are held in meshing engagement to the planetary gears, respectively, and are different in pitch from the first ring gears. Between the planetary gears a permanent magnet is provided to have a pair of polarities different in the axial direction thereof. A plurality of electromagnetic coils are provided equiangularly in each of the first ring gears and each has an axis extending radially so that the electromagnetic coils are able to generate different polarities at portions radially inwardly and outwardly of the first ring gear, the polarities being held in face-to-face relationship to the polarities, respectively, of the permanent magnet in the radial direction of the first ring gear. This results in the fact that the polarities of the electromagnetic coils are circumferentially successively changed if the electromagnetic coils are circumferentially successively energized. Therefore, there are generated circumferentially successively attractive forces which cause the planetary gears to rotate about their axes of rotation and to revolve about the center axis of the first ring gears. The second ring gears are thus caused to rotate about their axes of rotation by the reason that the first and second ring gears are held in meshing engagement to the planetary gears, respectively, and the second gears are different in pitch from the first ring gears. This means that first and second arms can be pivoted with respect to each other about their axes of rotation at reduced speeds correspoding to the gear ratio of the first and second ring gears.

Difficulties are however encountered in that the prior-art geared motor are unnecessarily made bulky and large in size since the geared motor requires a pair of first ring gears, a pair of second ring gears and a pair of planetary gears which are arranged in the axial direction of the geared motor as described above. For the reason that the polarities of the electromagnetic coils are circumferentially successively changed if the electromagnetic coils are circumferentially successively energized, all the teeth of the gears are magnetized and thus come to attract a large amount of iron powder on the surfaces thereof, thereby causing the surfaces of the gears to be worn and damaged.

OBJECTS OF THE INVENTION

It is therefore an object of the present invention to provide a geared motor which is small in size and light in weight.

SUMMARY OF THE INVENTION

In accordance with the present invention, a geared motor comprises: a housing; an output shaft rotatably received in the housing and having an axis of rotation passing therethrough; a sun gear securely supported on the output shaft in the housing and having an axis of rotation in coaxial relationship to the axis of rotation of the output shaft, the sun gear having an outer peripheral portion formed with a plurality of external teeth; a ring gear housed in the housing and having a center axis, the ring gear having an inner peripheral portion formed with a plurality of internal teeth held in meshing engagement with the external teeth of the sun gear, and the internal teeth of the ring gear having a pitch circle larger than that of the external teeth of the sun gear and being larger in number than the external teeth of the sun gear; supporting means for supporting the ring gear in such manner that the center axis of the ring gear is eccentrically revolvable with respect to the axis of rotation of the output shaft and the ring gear is prevented from being rotatated about its center axis; and drive means for generating electromagnetic forces one group of which has a plurality of force directions radially inwardly directed and the other group of which has a plurality of force directions radially outwardly directed, the different group being circumferentially successively displaceable about the axis of rotation of the sun gear and driving the ring gear to radially inwardly and outwardly move with respect to the sun gear so that the output shaft is driven to rotate about its axis of rotation.

BRIEF DESCRIPTION OF THE DRAWINGS

The detailed features and advantages of a geared motor according to the present invention will be understood from the following description taken in conjunction with the following drawings in which like reference numerals designate similar to corresponding members and portions in which.

PREFERRED EMBODIMENT OF THE INVENTION

Figure 1:
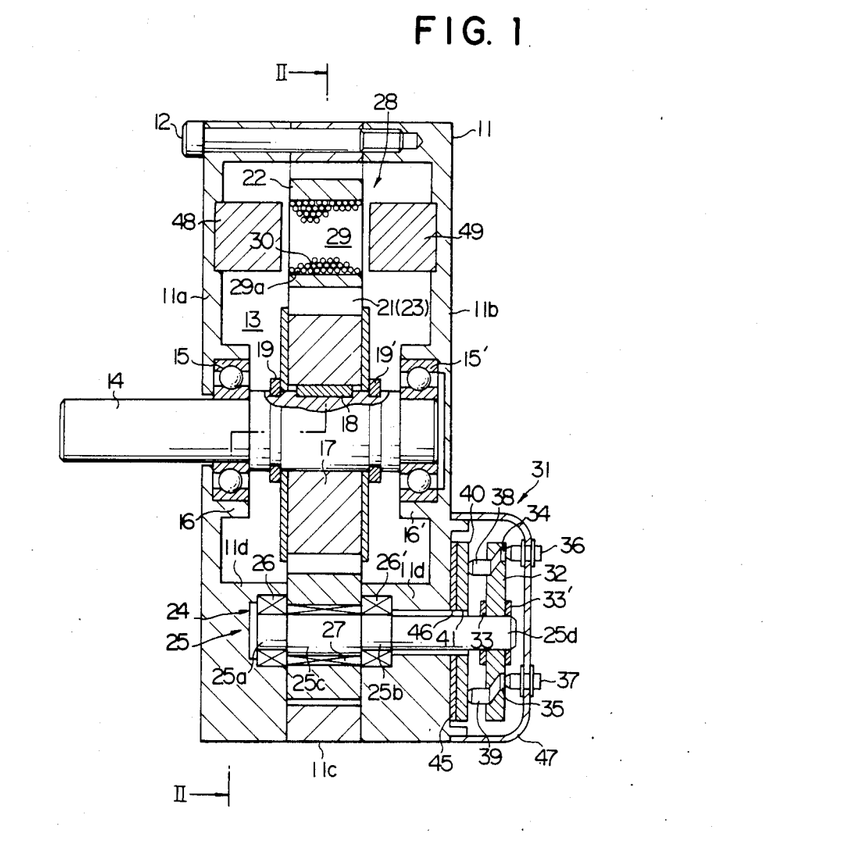
FIG. 1 is a cross sectional view of a first embodiment of a geared motor according to the present invention.
Figure 2:
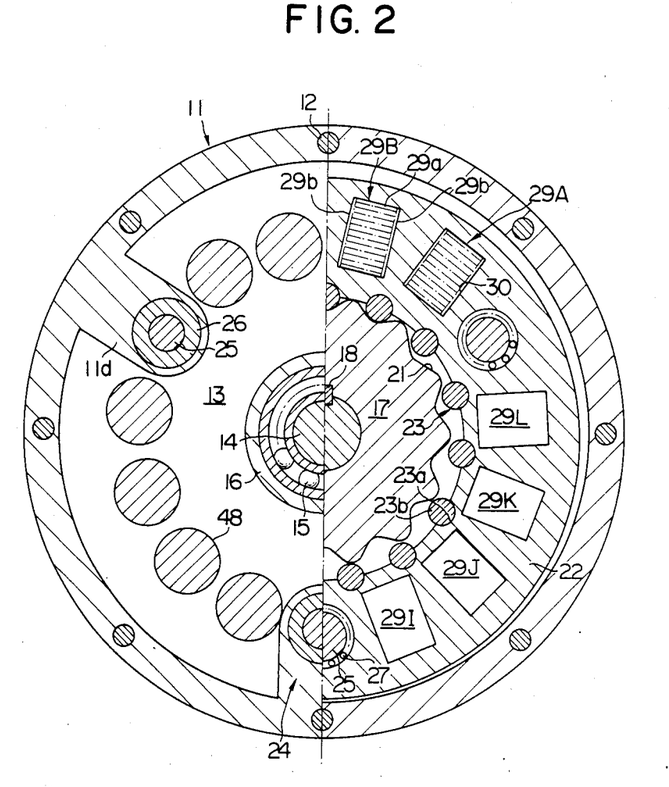
FIG. 2 is a cross sectional view taken on lines II—II of FIG. 1.
Figure 3:
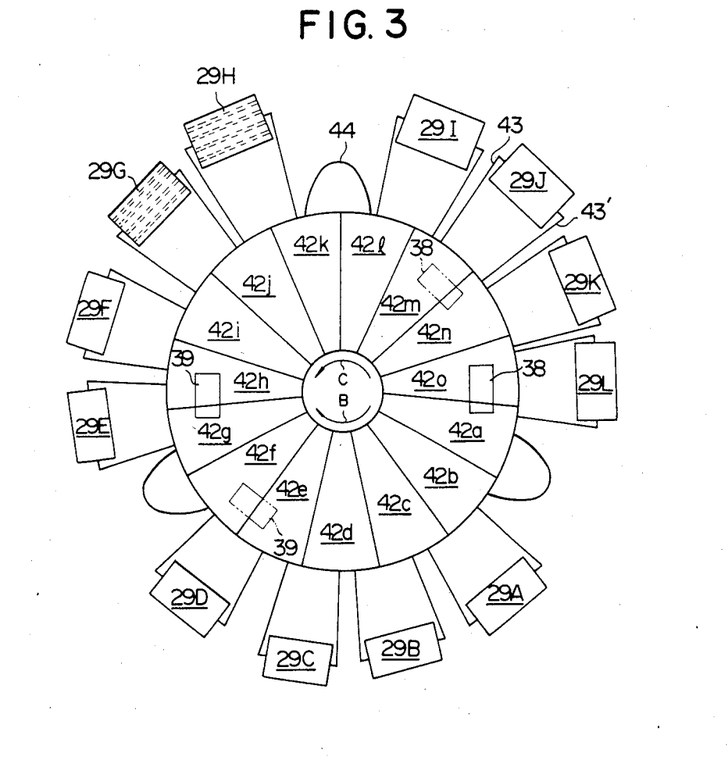
FIG. 3 is a view showing an arrangement of electrically conductive stack and a terminal plate consisting of electrically conductive plate elements electrically connected by lead lines to the stack.

For better understanding of the features and advantages of the present invention, description will now be made with reference to the first embodiment of the geared motor according to the present invention. In FIGS. 1 to 3 of the drawings, the geared motor is shown as comprising a housing generally indicated by the reference numeral 11 and including a pair of outer housing portions 11a and 11b and an intermediate housing portion 11c interposed between said outer housing portions 11a and 11b. The outer housing portions 11a and 11b are respectively formed with a plurality of protrusions 11d, three protrusions in the instant embodiment of the present invention, which are equiangularly spaced apart from one another and radially inwardly projected from the inner circumferential surface of the outer housing portions 11a and 11b of the housing 11, respectively. The housing portions 11a, 11b, and 11c are coupled to one another by means of bolts 12 to form a chamber 13 therein. The geared motor according to the present invention further comprises an output shaft 14 having an axis of rotation passing therethrough and rotatably received in the outer housing portions 11a and 11b by means of bearings 15 and 15' respectively received in boss portions 16 and 16' formed at the inner sides of the outer housing portions 11a and 11b. The geared motor according to the present invention further comprises a sun gear 17 securely supported on the output shaft 14 in the chamber 13 of the housing 11, with its axis of rotation being in coaxial relationship to the axis of rotation of the output shaft 14, by means of a suitable key 18 and a pair of snap rings 19 and 19'. The sun gear 17 has an peripheral portion formed with a plurality of external teeth 21. The geared motor according to the present invention further comprises a ring gear 22 housed in the chamber 13 of the housing 11 to surround the sun gear 17 and having a center axis. The ring gear 22 has an inner peripheral portion formed with a plurality of internal teeth 23 held in meshing engagement with the external teeth 21 of the sun gear 17. The internal teeth 23 of the ring gear 22 is constituted by a plurality of axial grooves 23a equiangularly formed in the peripherally inner portion of the ring gear 22 and extending in parallel with the axis of rotation of the sun gear 17 to have semi-circular cross sections, respectively, and a plurality of cylindrical bar members 23b each rotatably received in the axial groove 23a. The internal teeth 23 of the ring gear 22 has a pitch circle larger than that of the external teeth 21 of the sun gear 17 and are larger in number than the external teeth 21 of the sun gear 17. In the instant embodiment of the geared motor according to the present invention, the number of external teeth 21 of the sun gear 17 is 14 while the number of internal teeth 23 of the ring gear 22 is 15.

The geared motor according to the present invention further comprises supporting means 24 which comprises a plurality of crank shafts 25 circumferentially equally spaced apart from one another and each having axial end portions 25a and 25b rotatably received in the protrusions 11d of the outer housing portions 11a and 11b, respectively, of the housing 11 through bearings 26 and 26' and axially aligned with each other, and an axial intermediate portion 25c rotatably received in the ring gear 22 through a bearing 27. Further, one of the crank shafts 25 has an extension portion 25d extending outwardly from the outer housing portion 11b of the housing 11. The axial intermediate portion 25c of the crank shaft 25 has a center axis which is revolvable with respect to the axes of rotation of the axial end portions 25a and 25b of the crank shaft 25. It will thus be understood that the ring gear 22 is adapted to be supported by the supporting means 24 in such a manner that the center axis of the ring gear 22 is eccentrically revolvable with respect to the the axis of rotation of the output shaft 14 but the ring gear 22 is prevented from being rotated about its center axis.

The geared motor according to the present invention further comprises drive means 28 which comprises a plurality of electrically conductive stacks 29A to 29L respectively received in a plurality of through bores 30 formed in the ring gear 22 in circumferentially spaced relationship to one another. Each of the stacks 29A to 29L comprises a number of electrically conductive members 29a such as plates or wires circumferentially extending and radially superimposed on one another and a pair of terminal plates 29b electrically connected to each other through the electrically conductive members 29a. The crank shafts 25 are interposed between the stacks 29D and 29E, 29H and 29I, and 29L and 29A so that the stacks 29A to 29L and the crank shafts 25 are circumferentially equally spaced apart from one another. The drive means 28 further comprises a power distributor 31 for distributing the electromagnetic forces into two groups one group of which has a plurality of force directions radially inwardly directed and the other group of which has a plurality of force directions raidally outwardly directed, the different groups being circumferentially successively displaceable about the axis of rotation of the sun gear 17 and driving the ring gear 22 to radially inwardly and outwardly move with respect to the sun gear 17 so that the output shaft 14 is driven to rotate about its axis of rotation. The power distributor 31 comprises a rotary plate 32 made of an electrically insulating material and securely supported on the extension portion 25d of the crank shaft 25 by means of snap rings 33 and 33', the rotary plate 32 having embedded therein a pair of electrically conductive rings 34 and 35 having different diameters on its axially outer end surface, remote from the ring gear 22, and radially spaced apart from each other, a pair of terminals 36 and 37 electrically connected to a direct current source and held in slidable contact with the conductive rings 34 and 35, respectively, a pair of brushes 38 and 39 symmetrically positioned with respect to the center axis of the rotary plate 32 and electrically connected to the conductive rings 34 and 35, respectively, and a terminal plate 40 having formed therein a center hole 41 allowing the extension portion 25d of the crank shaft 25 to extend therethrough and consisting of a plurality of wedge-shaped electrically conductive plate elements 42a to 42o circumferentially arranged and electrically insulated to one another, the conductive plate elements 42a to 42o being held in slidable contact with the brushes 38 and 39. The terminal plates of each of the stacks 29A to 29L are respectively electrically connected to two adjacent conductive plate elements 42a to 42o by lead lines 43 and 43'. More specifically, each of the conductive plate elements 42a to 42o is electrically connected to the two adjacent stacks 29A to 29L by the lead lines except for three short-cut lines where the radial protrusions 11d are projected from the inner surface of the outer housing portions 11a and 11b of the housing 11. An electrically insulating disc member 45 is interposed between the terminal plate 40 and the outer housing portion 11b of the housing 11 and has formed therein a center hole 46 allowing the extension portion 25d of the crank shaft 25 to extend therethrough. A cover member 47 has the terminals 36 and 37 securely supported thereon and is securely mounted on the outer housing portion 11b of the housing 11 to cover the rotary plate 32, the terminal plate 40 and the disc member 45. The drive means 28 further comprises a plurality of pairs of permanent magnets 48 and 49, corresponding in number to the stacks 29A to 29L, mounted on the inner surfaces of the outer housing portions 11a and 11b of the housing 11 in circumferentially spaced and opposing relationship to each other with the stacks 29A to 29L being interposed therebetween, the permanent magnets 48 and 49 having opposing end portions different in polarity to cause magnetic fluxes to pass through the stacks 29A to 29L. The terminal plates of the stacks 29A to 29L are energized when direct currents are caused to pass through the electrically conductive plate elements 42a to 42g and 42o to 42h by arrows B and C opposite to each other if the brushes 38 and 39 are plus and minus, respectively. At this time, there are generated electro magnetic forces having directions directed radially inwardly and outwardly with the agency of the permanent magnets 48 and 49 by Fleming's Left-hand Rule. One group of the electro magnetic forces generated by the electrically conductive plate elements 42a to 42g has a plurality of force directions radially inwardly directed while the other group of the electro magnetic forces generated by the electrically conductive plate elements 42o to 42h has a plurality of force directions radially outwardly directed. The different magnetic forces causes the axis of rotation of the ring gear 22 to revolve about the axis of rotation of the sun gear 17 and to prevent the ring gear to rotate about its center axis.

Operation of the geared motor thus constructed and arranged will be described hereinlater.

If direct currents are caused to pass through the electrically conductive plate elements 42a to 42g and 42o to 42h by arrows B and C opposite to each other under the condition that the brushes 38 and 39 are plus and minus, respectively, as shown in FIG. 3, electro magnetic forces are generated to have directions directed radially inwardly and outwardly by Fleming's Left-hand Rule. One group of the electro magnetic forces generated by the electrically conductive plate elements 42a to 42g has a plurality of force directions radially inwardly directed while the other group of the magnetic forces generated by the electrically conductive plate elements 42o to 42h has a plurality of force directions radially outwardly directed. The resultant different electro magnetic forces of the two groups act upon the ring gear 22 by the reason that the internal teeth of the ring gear 22 have a pitch circle larger than that of the teeth of the sun gear 17 and is larger in number than the teeth of the sun gear 17 with the result that the center axis of the ring gear 22 is caused to revolve about the axis of rotation of the sun gear 17 while the ring gear 22 is prevented to rotate about its center axis. The output shaft 17 is thus rotated in a counterclockwise direction in FIG. 2. As the center axis of the ring gear 22 is caused to revolve about the axis of rotation of the sun gear 17, the crank shaft 25 is caused to rotate about the axes of rotation of the axial end portions thereof so that the rotary plate 32 is caused to rotate with respect to the terminal plate 40. The groups constituting stacks 29A to 29L are thus changed circumferentially successively to continue rotation of the output shaft 14. The reduction ratio between the ring gear 22 and the output shaft 14 is 1/15, viz., only one revolution of the sun gear 17 per fifteen revolutions of the ring gear 22 since the number of external teeth 21 of the sun gear 17 is 14 while the number of internal teeth 23 of the ring gear 22 is 15. This makes it possible to produce a geared motor having a characteristic of low speeds and high torques.

It is thus to be understood that there is no need for a pair of first ring gears, a pair of second ring gears and a pair of planetary gears as required in the conventional geared motor whilst there is required a ring gear, a sun gear and a pair of permanent magnets according to the present invention. This renders it possible to make smaller in size a geared motor according to the present invention than that of the prior-art geared motor. No iron powder is attracted on the outer surfaces of the teeth of the sun gear 17 and the ring gear 22 since the sun gear 17 and the ring gear 22 are by no means magnetized. The surfaces of the teeth of the sun gear 17 and the ring gear 22 are therefore prevented from being worn and damaged.

While it has been described in the first embodiment that the sun gear 17 is securely supported on the output shaft 14, the sun gear 17 may be integrally formed on the output shaft 14 according to the present invention. The expression "securely supported" appearing in the claims is intended to cover "integrally formed" according to the present invention.

Figure 4:
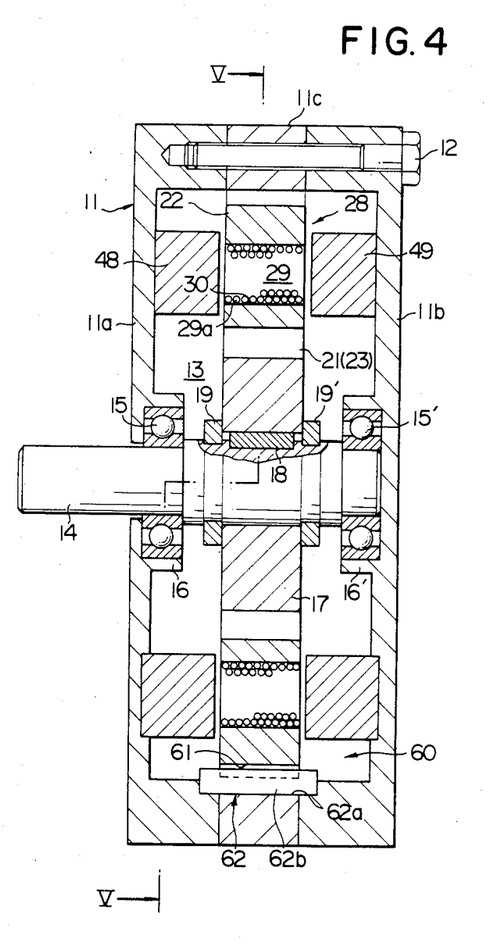
FIG. 4 is a cross sectional view similar to FIG. 1 but showing a second embodiment of the geared motor according to the present invention.
Figure 5:
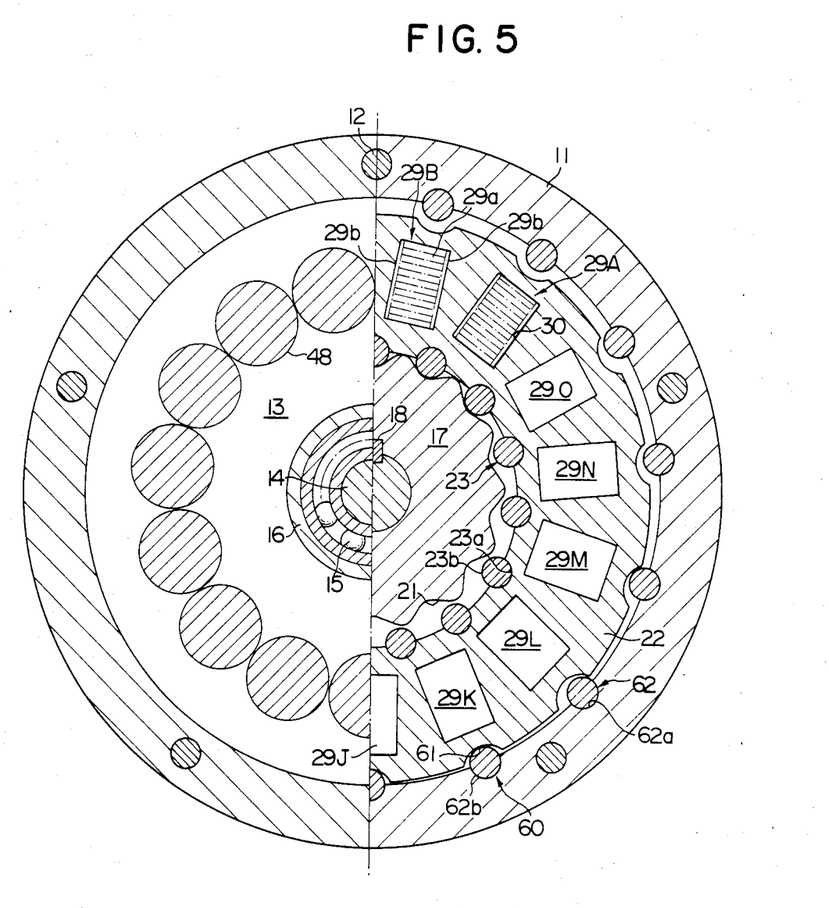
FIG. 5 is a cross sectional view taken on lines V—V of FIG. 4.

The second embodiment of the geared motor will be described hereinlater with reference to FIGS. 4 and 5.

In the second embodiment of the geared motor, the members and portions similar to those of the preceding first embodiment according to the present invention have reference numerals identical to those of the first embodiment as shown in FIGS. 1 to 3. Description will thus be omitted about the similar members and portions of the instant embodiment of the geared motor.

The second embodiment of the geared motor according to the present invention comprises supporting means 60 which comprises a plurality of external teeth 61 equiangularly formed in the peripherally outer portion of the ring gear 22 and extending in parallel with the axis of rotation of the sun gear 17 to have semi-circular cross sections, respectively, a plurality of internal teeth 62 constituted by axial grooves 62a equiangularly formed in the inner circumferential portions of the axially outer end portions 11a and 11b and the axially intermediate portion 11c of the housing 11 and extending in parallel with the axis of rotation of the sun gear 17 to have semi-circular cross sections, respectively, and a plurality of cylindrical bar members 62b each securely received in each of the axial grooves 62a and held in meshing engagement with the external teeth 61 of the ring gear 22.

The ring gear 22 can be supported by the supporting means 60 different in construction from the supporting means 24 so that the geared motor requires no crank shafts and protrusions as shown in FIGS. 1 and 2 of the drawings. This means that more electrically conductive stacks and permanent magnets are arranged in the second embodiment of the geared motor. Therefore, intensive electro magnetic forces can be generated and act upon the ring gear, thereby resulting in higher torques to the second embodiment of the geared motor. Although a power distributor is not shown described in the second embodiment of the geared motor for distributing the electromagnetic forces into two groups one group of which has a plurality of force directions radially inwardly directed and the other group of which has a plurality of force directions raidally outwardly directed, the different groups are adapted to be circumferentially successively displaceable about the axis of rotation of the sun gear 17 by suitable control means.

Figure 6:
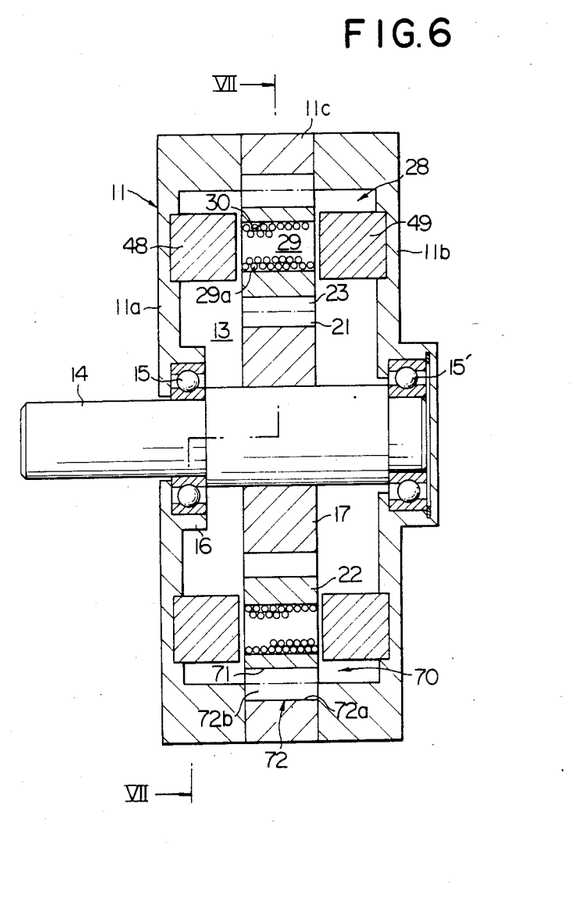
FIG. 6 is a cross sectional view similar to FIG. 1 but showing a third embodiment of the geared motor according to the present invention.
Figure 7:
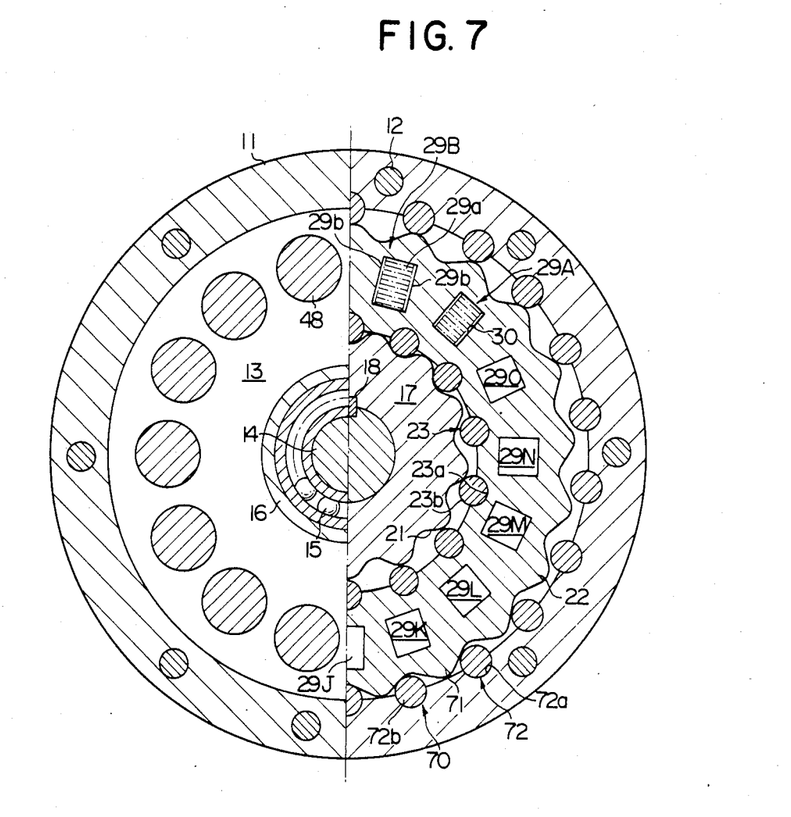
FIG. 7 is a cross sectional view taken on lines VII—VII of FIG. 6.

The third embodiment of the geared motor will be described hereinlater with reference to FIGS. 6 and 7.

In the third embodiment of the geared motor, the members and portions similar to those of the preceding first and second embodiments according to the present invention have reference numerals identical to those of the first and second embodiments as shown in FIGS. 1 to 5. Description will thus be omitted about the similar members and portions of the instant embodiment of the geared motor.

The third embodiment of the geared motor according to the present invention comprises supporting means 70 different in construction from the supporting means 24 and 60 in the first and second embodiment of the geared motor according to the present invention. The supporting means 70 is adapted to support the ring gear 22 in such manner that the center axis of the ring gear 22 is revolvable with respect to the axis of rotation of the output shaft 14 and is rotated about its axis of rotation with respect to the housing 1. The supporting means 70 comprises a plurality of external teeth 71 formed in the external peripheral portion of the ring gear 22, a plurality of internal teeth 72 constituted by axial grooves 72a equiangularly formed in the inner circumferential portions of the axially intermediate portion 11c of the housing 11 and extending in parallel with the axis of rotation of the sun gear 17 to have semi-circular cross sections, respectively, and a plurality of cylindrical bar members 72b each rotatably received in the axial groove 72a and held in meshing engagement with the external teeth 71 of the ring gear 22. The internal teeth 72 of the housing 11 have a pitch circle larger than that of the external teeth 71 of the ring gear 22 and are larger in number than the external teeth 71 of the ring gear 22.

In the third embodiment of the geared motor according to the present invention, the ring gear 22 receives the resultant different electo magnetic forces of the two groups in a similar fashion to those of the first and second embodiment of the geared motor. The center axis of ring gear 22 is thus similarly caused to revolve about the axis of rotation of the sun gear 17 and being rotated about its axis of the rotation with respect to the housing 11. The output shaft 14 is thus rotated at low speeds and high torques.

The ring gear 22 can be supported by the supporting means 70 different in construction from the supporting means 24 so that the geared motor requires no crank shafts and protrusions as shown in FIG. 1 of the drawings. In the case of the instant embodiment, intensive electro magnetic forces can be generated and act upon the ring gear 22, thereby resulting in higher torques to the third embodiment of the geared motor for the reason similar to the second embodiment of the geared motor according to the present invention. No power distributor is shown described in the third embodiment of the geared motor, however, a suitable power distributor may be used for distributing the electromagnetic forces into two groups one group of which has a plurality of force directions radially inwardly directed and the other group of which has a plurality of force directions raidally outwardly directed, the different groups being circumferentially successively displaceable about the axis of rotation of the sun gear 17.

While there has been described in the previous embodiments of the geared motor about the electrically conductive stacks which are electrically connected to the direct current source, the stacks may be electrically connected to an alternate current source to generate rotary electromagnetic forces in a well known manner according to the present invention.

The revolutional speeds and directions of each of the output shafts 14 in the geared motors thus constructed and arranged in the above second and third embodiments may be controlled by a control circuit which will be described hereinafter with reference to FIG. 8.

Figure 8:
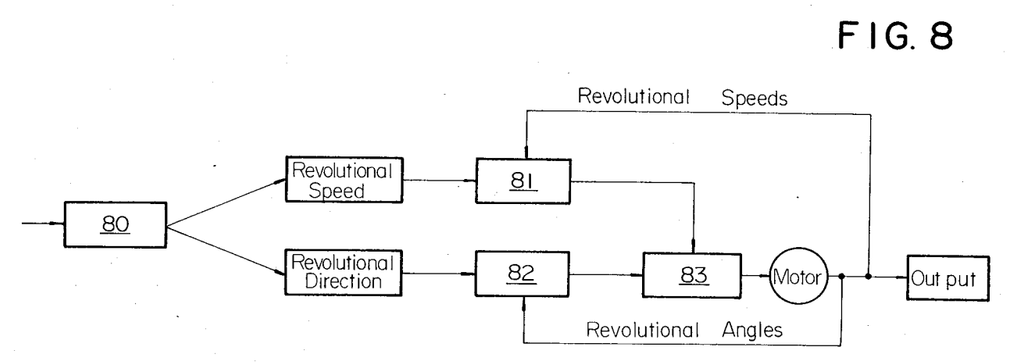
FIG. 8 is a control circuit for controlling the revolutional speeds and the rotational directions of the geared motor shown in FIGS. 4 to 7.

The control circuit is shown in FIG. 8 as comprising a controller 80 operated by a suitable external signal to decide the revolutional speeds and directions and operative to produce a signal, a direct current source 81 operative to receive the signal from the controller 80 and to supply direct current, a distributor 82 operative to receive the signal from the controller 80 and to produce a signal, a driver 83 operative to receive the direct current and signal from the direct current source 81 and the distributor 82 and to produce three-phase alternative current, a geared motor operative to receive the electric power from the driver 83 and to be rotated at low speeds and high torques. The revolutional speeds of the output shaft 14 are detected and feed-backed to the direct current source 81 while the revolutional angles of the output shaft 14 are detected and feed-backed to and the distributor 82. The geared motor is thus controlled to be rotated at predetermined revolutional speeds. In this instance, the stacks are divided into three groups which are electrically connected in a star connection and which are circumferentially successively changed by means of three-phase bipolar drive circuit as above-mentioned.

What is claimed is:

1. A geared motor comprising:
    a housing;
    an output shaft rotatably received in said housing and having an axis of rotation passing therethrough;
    a sun gear securely supported on said output shaft in said housing and having an axis of rotation in coaxial relationship to said axis of rotation of said output shaft, the sun gear having an outer peripheral portion formed with a plurality of external teeth having semi-circular cross sections;
    a ring gear housed in said housing and having a center axis, the ring gear having an inner peripheral portion formed with a plurality of internal teeth held in meshing engagement with said external teeth of said sun gear, and the internal teeth of the ring gear having a pitch circle larger than that of said external teeth of said sun gear and being larger in number than said external teeth of said sun gear and being constituted by a plurality of axial grooves equiangularly formed in said peripherally inner portion of said ring gear and extending in parallel with the axis of rotation of said sun gear to have semi-circular cross sections, respectively, and a plurality of cylindrical bar members each rotatably received in said axial grooves;
    supporting means for supporting said ring gear in such manner that said center axis of said ring gear is eccentrically revolvable with respect to said axis of rotation of said output shaft and said ring gear is prevented from being rotated about its center axis;

said supporting means comprising a plurality of crank shafts circumferentially equally spaced apart from one another and each having axial end portions rotatably received in said housing and axially aligned with each other and an axial intermediate portion rotatably received in the ring gear, the axial intermediate portion having a center axis which is revolvable with respect to the axes of rotation of the axial end portions; and drive means for generating electromagnetic force to drive said ring gear to radially move with respect to said sun gear so that said output shaft is driven to rotate about its axis of rotation.

2. A geared motor comprising:

a housing;

an output shaft rotatably received in said housing and having an axis of rotation passing therethrough;

a sun gear securely supported on said output shaft in said housing and having an axis of rotation in coaxial relationship to said axis of rotation of said output shaft, the sun gear having an outer peripheral portion formed with a plurality of external teeth having semi-circular cross sections;

a ring gear housed in said housing and having a center axis, the ring gear having an inner peripheral portion formed with a plurality of internal teeth held in meshing engagement with said external teeth of said sun gear, and the internal teeth of the ring gear having a pitch circle larger than that of said external teeth of said sun gear and being larger in number than said external teeth of said sun gear and being constituted by a plurality of axial grooves equiangularly formed in said peripherally inner portion of said ring gear and extending in parallel with the axis of rotation of said sun gear to have semi-circular cross sections, respectively, and a plurality of cylindrical bar members each rotatably received in said axial grooves;

supporting means for supporting said ring gear in such manner that said center axis of said ring gear is eccentrically revolvable with respect to said axis of rotation of said output shaft and said ring gear is rotatable about its center axis;

said supporting means comprising a plurality of external teeth having semi-circular cross sections and formed in the outer peripheral portion of said ring gear, a plurality of internal teeth constituted by axial grooves equiangularly formed in the inner circumferential portion of said housing and extending in parallel with said axis of rotation of said sun gear to have semi-circular cross sections, respectively, and a plurality of cylindrical bar members each rotatably received in said axial grooves and held in meshing engagement with said external teeth of said ring gear, said internal teeth of said housing having a pitch circle larger than that of the external teeth of said ring gear and are larger in number than the external teeth of said ring gear; and drive means for generating electromagnetic force to drive said ring gear to radially move with respect to said sun gear so that said output shaft is driven to rotate about its axis of rotation.

* * * * *